United States Patent [19]

Akins

[11] Patent Number: 4,924,032

[45] Date of Patent: May 8, 1990

[54] PREWIRED ELECTRICAL JUNCTION BOX

[76] Inventor: Charles S. Akins, 1117 Trellis, Garland, Tex. 75040

[21] Appl. No.: 890,631

[22] Filed: Jul. 30, 1986

[51] Int. Cl.⁵ .............................................. H02G 3/18
[52] U.S. Cl. ....................................... 174/53; 307/147
[58] Field of Search ............................ 174/53, 59, 49; 200/51 R, 297; 307/147; 339/122 R, 122 F, 150 T, 198 R, 18 R, 18 B, 18 C, 18 P; 439/535

[56] References Cited

U.S. PATENT DOCUMENTS

| | | | |
|---|---|---|---|
| 2,410,287 | 10/1946 | Jaberg | 174/53 |
| 2,433,917 | 1/1948 | McCartney | 174/53 |
| 2,920,303 | 1/1960 | Johnson | 339/97 |
| 3,885,852 | 5/1975 | Grove | 339/95 D |
| 3,922,478 | 11/1975 | Perkey | 174/53 |
| 4,165,443 | 8/1979 | Figart et al. | 174/53 |
| 4,336,418 | 6/1982 | Hoag | 174/53 |

Primary Examiner—Leo P. Picard
Assistant Examiner—David A. Tone

[57] ABSTRACT

A prewired junction box that can be used as a lamp box, a switch box, or a receptacle box. The box has a plurality of different buss elements therein which provide a 3-way switch circuit; a single pole circuit; and a "hot" circuit. Each box can be quickly installed into an electrical service wiring circuit in a building of the like by inserting appropriate wires of an electrical conductor into appropriate openings in said box to complete a particular circuit. This eliminates hand-wiring and the need to ever enter the interior of the junction box.

7 Claims, 4 Drawing Sheets

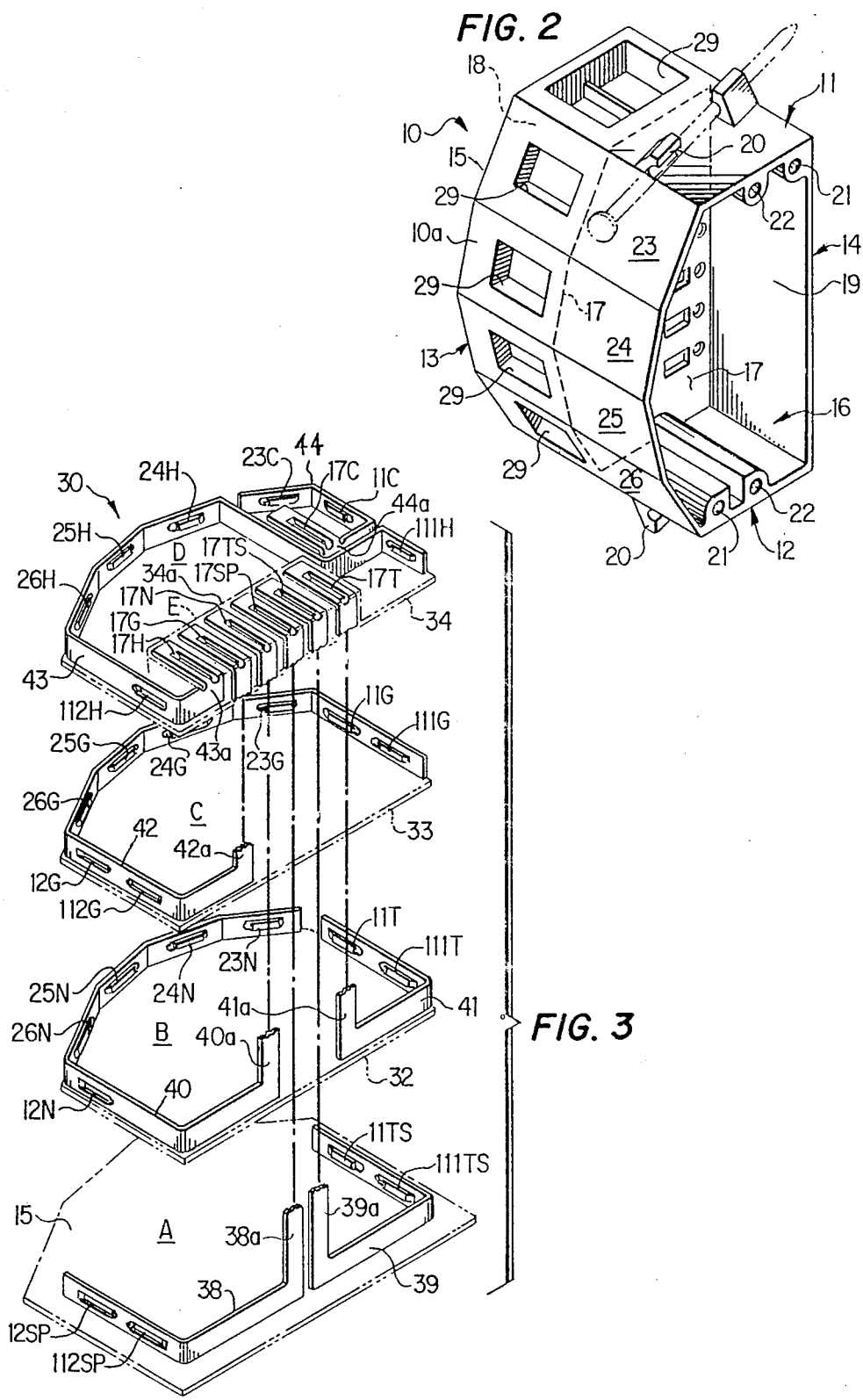

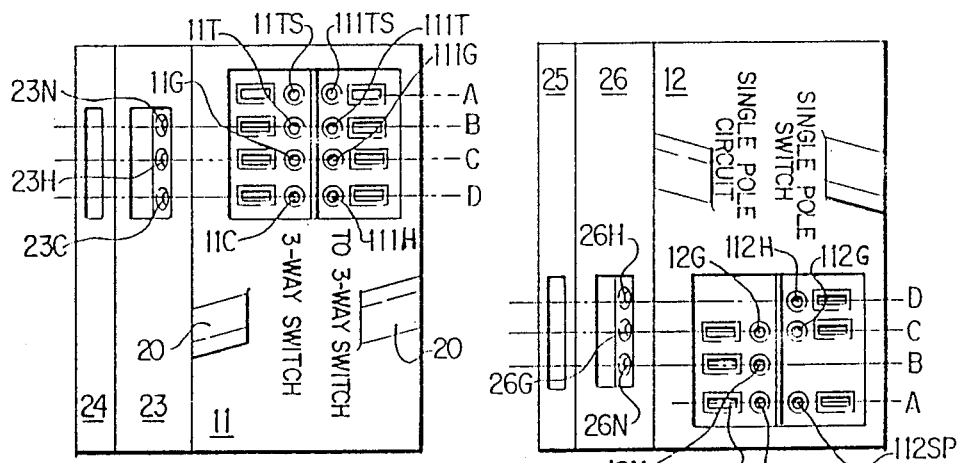
FIG. 4
FIG. 6
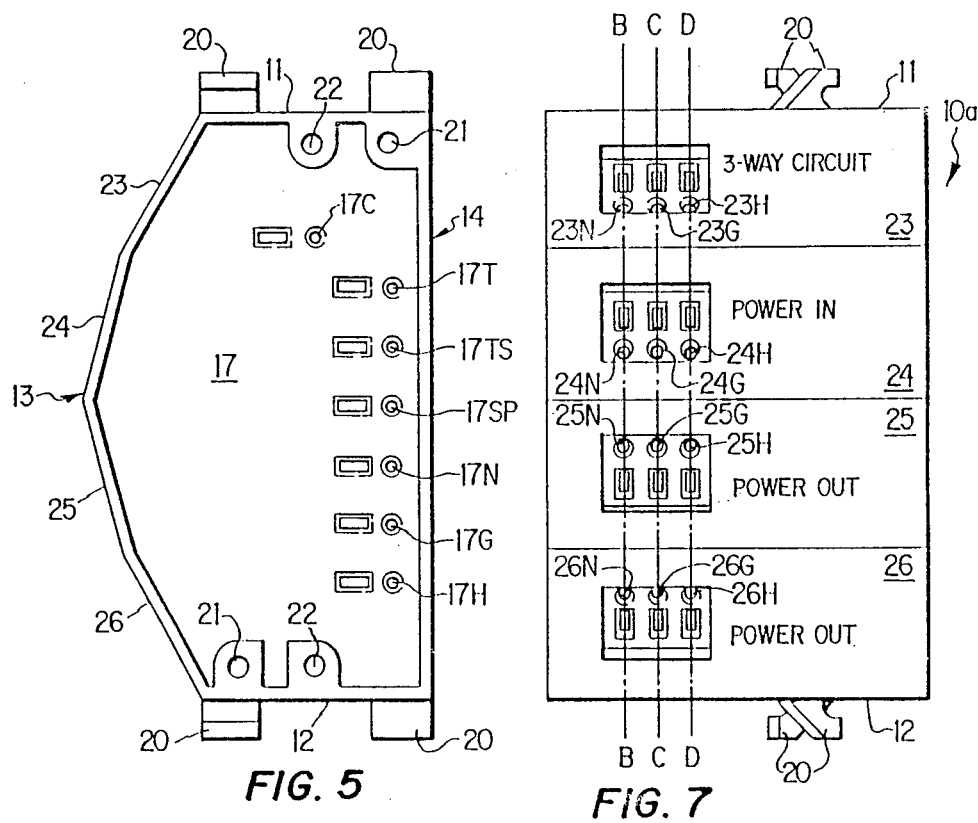
FIG. 5
FIG. 7

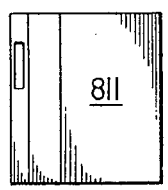
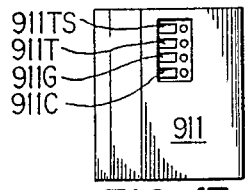
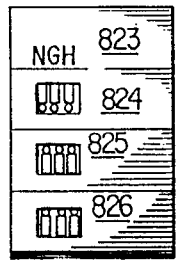
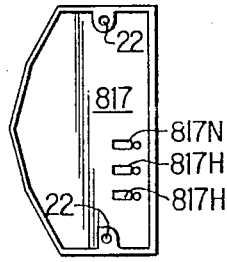
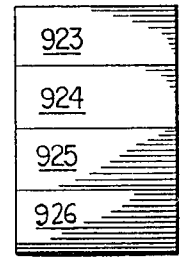
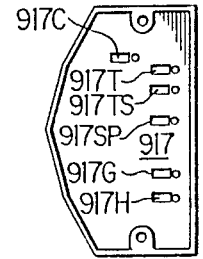
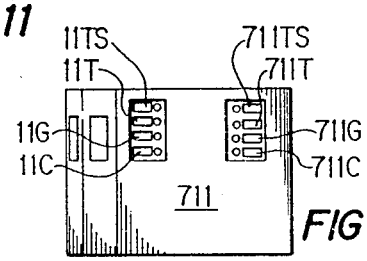
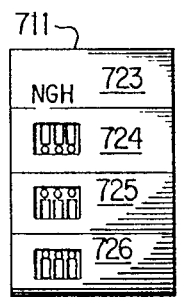
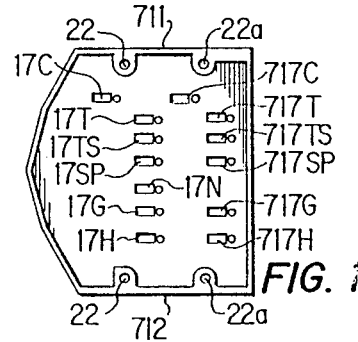
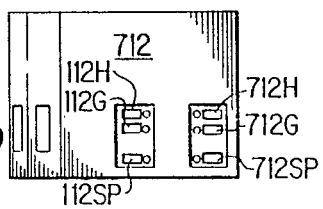

PREWIRED ELECTRICAL JUNCTION BOX

DESCRIPTION

1. Technical Field

The present invention prelates to a prewired electrical junction box and more particularly relates to a universal prewired junction box that can be used for all standard wiring applications normally encountered in installing electrical service in residential or other buildings.

2. Background Art

Presently, the installation of electrical service in a house or building requires a large number of hand-wiring operations by a skilled electrician. For example, hand-wirings are normally made at each switch, light fixture, receptacle, and/or at each common wiring junction throughout the system. As will be understood in the art, such hand-wiring operations require connecting the proper wires together within an appropriate junction box. As is recognized, this hand-wiring is time-consuming and greatly adds to the overall costs of the electric service installation.

Also, anytime hand-wiring is involved, there is always a possibility that a particular circuit or element therein may be mis-wired thereby resulting in a short circuit or an otherwise inoperable circuit. Such mis-wirings can be dangerous and are obviously costly to find and correct. Therefore, a need exists for a prewired junction box that can be quickly installed at any wiring point in a circuit whereby all of the required electrical wires can be quickly connected into their proper respective terminals in the box thereby completing the circuit without any need for hand-wiring.

Several prewired junction boxes have been proposed which are designed to eliminate several of the hand-wired operations normally required in installing electrical service. For example, U.S. Pat. No. 4,165,443 discloses a first component mounting box for receiving a single pole switch or receptacle, other differently designed boxes for receiving three or four-way switches, and still other boxes for receiving lamp fixtures or the like. While the various component boxes disclosed in U.S. Pat. No. 4,165,443 do eliminate several hand-wiring steps, the disclosed structures therein require the use of substantially differently constructed boxes having different internal "wiring" therein for each specific application. Further, each of the boxes disclosed require the use of specially-constructed elements, i.e. switches, receptacles, etc., in conjunction with a particular box. While some hand-wiring is eliminated, the benefits gained by these boxes are off-set by the requirement that several different boxes are needed to complete a simple circuit and special switches and receptacles are needed which are not readily available in typical commercial markets.

The same is true of other known "prewired" junction boxes such as those disclosed in U.S. Pat. Nos. 2,410,287; 2,433,917; 2,920,303; 3,885,852; 3,922,478; and 4,336,418. With each of these disclosed boxes, specially built, plug-in switches and/or receptacles are required. Again, each of these boxes eliminates some hand-wiring but due to the limited use of each box to a particular application and the requirement for non-commercially available switches and/or receptacles, these prior art boxes appear to have limited, if any, use in the standard wiring operations now used throughout the electrical installation industry.

DISCLOSURE OF THE INVENTION

The present invention provides a universal prewired junction box that is capable of effecting all wiring connections normally encountered in the routine installation of electrical service in a building or the like.

The box is comprised of a housing having a top, bottom, back, and a four-faced polygonal front. The housing is divided into a buss compartment and a utility compartment by an integrally formed partition. A plurality of electrically-conductive buss elements are positioned in separate planes within the buss compartment and form conductive pathes between respective openings through the external surface of said housing and openings through said partition.

One set of buss elements form a 3-way switch circuit through the housing where said box, when used to mount a utility device, (i.e. lamp) can be quickly connected to two separate remote 3-way switches. The lamp is electrically connected to the box through openings in said partition. Switch boxes of the same construction as the lamp box are connected to the lamp box and are used to mount the remote 3-way switches. Another set of buss elements in said housing form a single pole switch circuit for a lamp or the like to be controlled by the single pole circuit when the box is to be used as a lamp box or for mounting a single pole switch to control same when the box is to be used as a switch box.

Still other sets of buss elements within the housing provide outlet means on one box being used as a utility box, (i.e. lamp box) and inlet means on a second lamp box whereby said boxes can be connected together to allow a second lamp or the like to be controlled by either the 3-way switch circuit or the single pole switch circuit, as the case may be. Certain of the buss elements also provide a hot circuit through said box which, in turn, can be connected to a source of electricity whereby that box can be used to power a lamp or can be used to mount standard receptacles therein. Openings also provide access to this hot circuit so that power can be taken from any "hot" box and supplied to additional boxes if needed.

As can be seen from above, the prewired junction box of the present invention is truly universal since a box of standard construction can be used (1) to mount a standard lamp fixture or the like which are to be controlled by either two remote 3-way switches or by a single pole switch; (2) to connect one lamp box to another lamp box to allow two lamps to be controlled by the same 3-way circuit or the same single pole circuit; (3) to mount a standard 3-way switch or a standard single pole switch; (4) to connect one hot box to another hot box to transfer power therebetween; or (5) to mount a standard receptacle.

Any of these named functions can be quickly carried out without any hand-wiring being required and without ever entering the interior of the housing. In each instance, an electrical conductor, e.g. 3 or 4 wire cable, is stripped and inserted through the appropriate openings in said housing and into wire retaining slots on the buss elements which are adjacent said openings. The slots grip and hold the wires in electrical contact with the respective buss element. Also two sets of mounting holes having different distances there between are provided across the utility compartment whereby a standard switch or receptacle can be mounted in one set of holes when a junction box is so used or a standard lamp fixture can be mounted in the other set when a junction box.

BRIEF DESCRIPTION OF THE DRAWINGS

The actual construction, operation, and apparent advantages of the present invention will be better understood by referring to the drawings in which like numerals identify like parts and in which:

FIG. 2 is a perspective of the present prewired junction box;

FIG. 3 is an exploded view, partly broken away, of the buss elements of the present junction box;

FIG. 4 is a top view of the box of FIG. 2;

FIG. 5 is a side view of the box of FIG. 2;

FIG. 6 is a bottom view of the box of FIG. 2;

FIG. 7 is a front view of the box of FIG. 2;

FIG. 8 is a front view of another embodiment of the box of FIG. 2;

FIG. 9 is a top view of the box of FIG. 8;

FIG. 10 is a side view of the box of FIG. 8;

FIG. 11 is a bottom view of the box of FIG. 8;

FIG. 12 is a front view of still another embodiment of the box of FIG. 2;

FIG. 13 is a top view of the box of FIG. 12;

FIG. 14 is a side view of the box of FIG. 12;

FIG. 15 is a bottom view of the box of FIG. 12;

FIG. 16 is a front view of still another embodiment of the box of FIG. 2;

FIG. 17 is a top view of the box of FIG. 16;

FIG. 18 is a side view of the box of FIG. 16; and

FIG. 19 is a bottom view of the box of FIG. 16.

BEST MODE FOR CARRYING OUT THE INVENTION

Figure 1:
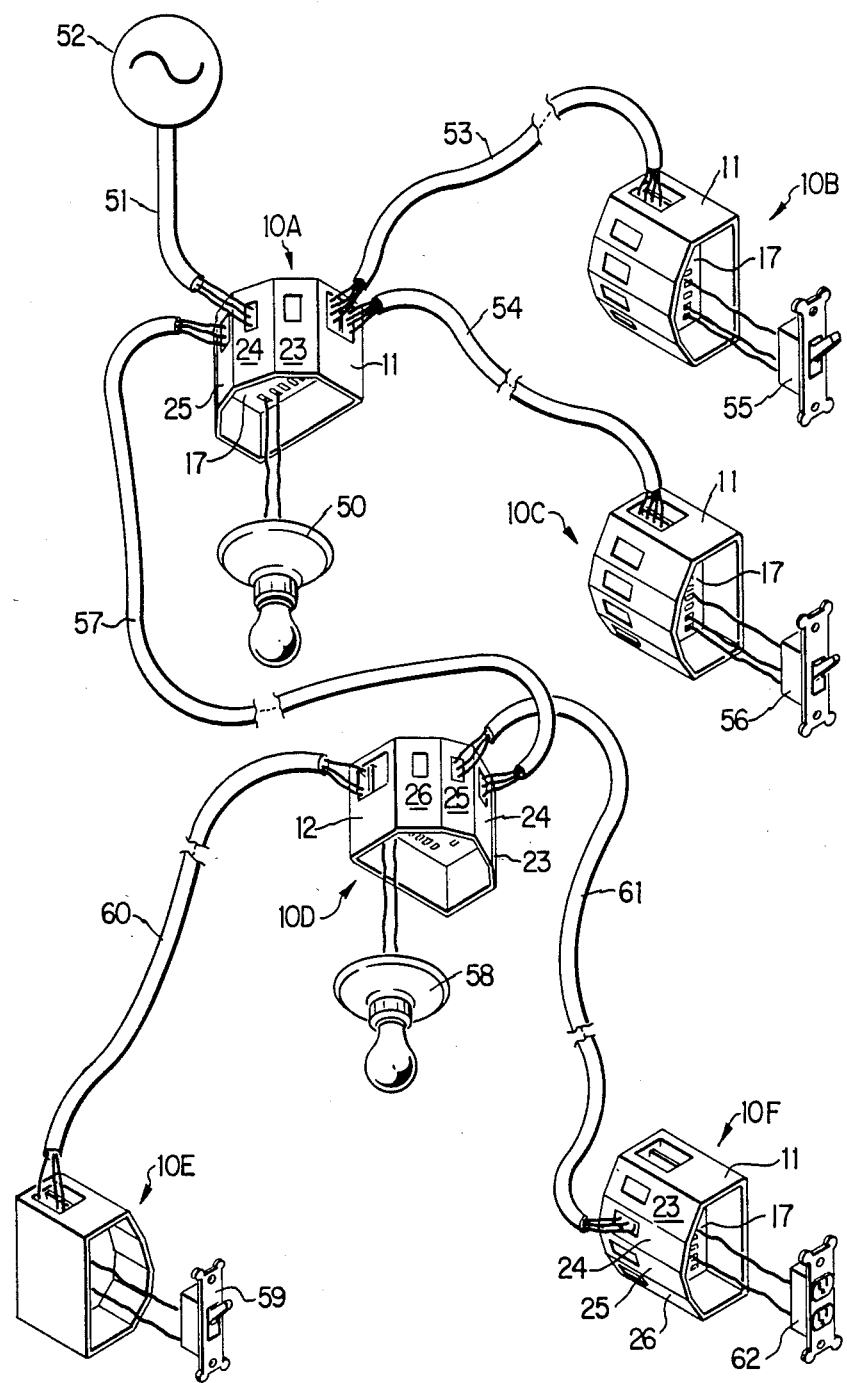
FIG. 1 is a perspective of an electrical wiring circuit disclosing the many uses of the prewired junction box of the present invention.

Referring more particularly to the drawings, FIG. 2 is a perspective of the present universal, prewired junction box 10. Box 10 is comprised of a housing 10a which has a top 11, bottom 12, polygonal front 13, back 14, and sides 15, 16. The terms "top", "bottom", "front", "back" and "sides", as used herein, are relative terms which are used to clarify the description herein and are not critical to the present invention since box 10 can be inverted, laid on its back or side, etc. when installed without any effect, whatsoever on its functions.

Housing 10 is comprised of an electrical insulative material, e.g. molded plastic, and is originally open on both sides 15, 16. Housing 10a has a partition 17 formed integrally therein which divides housing 10a into buss compartment 18 and utility compartment 19. Offset nail holders 20 are provided on top 11 and bottom 12 by which box 10 can be quickly affixed to a stud or the like when used in a wiring operation. Also mounting openings 21, 22 are provided at the top and bottom of utility compartment 19 by which a utility device, e.g. lamp, switch, receptacle, etc., can be mounted to housing 10a, as will be explained later.

As illustrated, polygonal front 13 of housing 10a has four contiguous faces 23, 24, 25, 26 which are angled with respect to each other to provide surfaces for four distinct sets of openings, which will be described in detail below. While front 13 could be curved or even flat, it is preferably stepped in a polygonal configuration as shown in the FIGS. to reduce the chances of wiring mistakes and also to eliminate the possibility of having to bend a wire at 90° before attaching same to box 10. This will become evident from the detail description which follows.

Referring now to FIGS. 3-7, buss assembly 30 (FIG. 3) and respective openings in housing 10a through which various buss elements will be accessible will now be described. To clarify the present description, each position on a particular buss element and the respective opening in housing 10a through which that particular position will be accessible will be identified by the same numeral. Also, all of the buss elements and their interrelationship will be described before setting forth all of the particular wiring sequences that can be carried out by using box 10.

As shown in FIG. 3, there are four dividers 15, 32, 33, 34 of electrical insulative material, e.g. plastic on which the various busses are mounted. The mounting detents, pegs, etc. that hold the buss elements in place on the dividers are not shown for the sake of clarity. Divider 15 is actually side 15 which closes buss compartment 18 of housing 10a which buss assembly is in place therein. The dividers form parallel planes A, B, C, D when assembly 30 is assembled. All buss elements are comprised of an electrical conductive material, e.g. copper, brass, etc. and all have slots positioned therein which are adapted to receive and hold an electrically conductive wire. As illustrated, these slots are of the type which are punched in the buss element to form a spring-like clip which grasps the wire when pushed into the slots thereby preventing the wire from being withdrawn unless the clip is depressed with a screw driver or the like to release the wire. This type of wire retaining means is well known in the art and other similar types of retaining means could be used without departing from the present invention. For example, a slit can be used into which the wire is merely wedged to be held thereby until the slit is spread by a screw driver or the like. Again, this is a well known wire retaining means in the industry.

Again referring to FIG. 3, two separate buss elements 38 and 39 are mounted on divider 15 and both have a first leg that lies in plane A and a second leg 38a, 39a respectively, perpendicular thereto which terminate in plane E. Buss 38 is to provide one element of a single pole switching circuit and has two wire retaining slots 12SP and 112SP in the first leg thereof which are accessible through openings 12SP and 112SP of housing 10a, respectively, (FIG. 6) and retaining slot 17SP in the second leg thereof which is accessible through opening 17SP in partition 17 of housing 10a (FIG. 5). As described throughout the figures, a particular wire will be inserted through an opening (e.g. 12SP in housing 10a) and will be held by the retaining slot on the buss lying therebelow. A screwdriver or the like can be inserted through slot 12SPa in housing 10a (only one slot numbered in the figures for the sake of clarity) to depress the spring clip to the wire.

Buss 39 provides one element of a 3-way switch circuit and has two wire retaining slots 11TS, 111TS which are accessible through openings 11TS, 111TS, respectively, (FIG. 4), and a retaining slot 17TS in the second leg thereof which is accessible through opening 17TS (FIG. 5).

Two separate busses 40, 41 are mounted on divider 32 which have a first leg in plane B and a perpendicular leg 40a, 41a, respectively, which terminates in plane E. Buss 40 provides a neutral buss through box 10 and has 5 wire retaining slots 12N, 26N, 25N, 24N, 23N which are accessible through openings 12N (FIG. 6), 26N, 25N, 24N, 23N (FIG. 7). Buss 41 provides a second element for the 3-way switch circuit and has two wire retaining slots 11T and 111T in the first leg thereof which are accessible through openings 11T, 111T, respectively (FIG. 4) and a wire retaining slot 17T in the second leg thereof which is accessible through opening 17T (FIG. 5).

Mounted on divider 33 is single buss element 42 which provides the ground buss for box 10. Buss 42 has a first leg lying in plane C and a perpendicular leg 42a which terminates in plane E. The first leg has 8 wire retaining slots 12G, 112G, 26G, 25G, 24G, 23G, 11G and 111G, which are accessible through respective like-numbered openings (FIGS. 4, 6, and 7) and the second leg has wire retaining slot 17G therein which is accessible through opening 17G (FIG. 5).

Two separate busses 43, 44 are mounted on divider 34 and each have a first leg in plane D and a respective perpendicular leg 43a, 44a which terminates in plane E. Buss 43 provides the "hot" buss for box 10 and has 5 wire retaining slots 112H, 26H, 25H, 24H, and 111H which are accessible through openings 112H (FIG. 6), 26H, 25H, 24H (FIG. 7) and 111H (FIG. 4). The other leg has a wire retaining slot 17H which is accessible through opening 17H (FIG. 5). Buss 44 provides the common buss for the 3-way switch circuit has two wire retaining slots 11C, 23C, in the first leg thereof which are accessible through openings 11C, 23C (FIGS. 4, 7). The other leg has wire retaining slot 17C which is accessible through opening 17C (FIG. 5). All of the wire retaining slots 17H-17C lie in a common plane E and all slid into separate slots on divider 34a which is formed integral with divider 34 and which electrically insulates these buss elements from each other.

All of the buss elements are assembled and then placed in buss compartment so that slots 17H-17C align with openings 17H-17C, respectively, through partition 17 and all other slots in the respective busses align with their respective openings in top 11, bottom 12, and faces 23-26. The dividers provide the necessary electrical insulation between the individual buss elements with divider 15 being secured to housing 10a to form an outer side 15 which enclosed the buss assembly 30 within buss compartment 18. Prewired junction box 10 is now ready for use and can be used to carry out any function normally required in standard electrical wiring operations.

Referring now to FIG. 1, the many uses to which the present prewired journal box 10 can be put is illustrated. Box 10A is shown as it would be used to hold a lamp 50 that is to be controlled by two 3-way switches. The box is affixed to a ceiling joist or the like (not shown) by nails through holders 20 on housing 10a with the power off, the insulation on one end of an electrical conductor means, e.g. 3-wire "Romex" cable 51, which is adapted to be connected to electricity source 52 is stripped to expose short lengths of the three individual wires (hot, ground, and neutral) in cable 57, as is well known in the wiring art. The hot, ground, and neutral wires are pushed through openings 24H, 24G, 24N (FIG. 7) and into corresponding wire retaining slots in the underlying buss elements which, in turn, grip and hold the respective wires in electrical contact with the respective buss elements. Please note that in all instances where electrical power is to be supplied to a particular junction box 10, the cable supplying the power will be attached to box 10 through the openings in face 24, as just described.

Still referring to FIG. 1, two separate lengths 53, 54 of 4-wire Romex cable are stripped at both ends to expose individual wires which are effectively to be connected to the traveler switch (TS), traveler(T), and the common (C) terminals of a 3-way switch circuit and to ground (G). Each of these wires, TS, T, G, C, at one end of cable 53 is attached to respective buss elements through openings 11TS, 11T, 11G, and 11C respectively (FIG. 4). The same wires at the other end of cable 53 are attached to box 10B through the same-numbered openings in top 11 of box 10B. The same wires, i.e. TS, T, C, G, of cable 54 are attached the busses within box 10A through openings 111TS, 111T, 111G, and 111H (FIG. 4) at one end and to openings 11TS, 11T, 11G, and 11C in box 10C. Note that where box 10 is to be used to hold a utility device, e.g. lamp 50, which is to be controlled by the 3-way circuit, (e.g. box 10A) both sets of openings 11TS etc and 111T etc are used to connect the cables which lead to boxes 10B and 10C which are to be used for the switches which, in turn, only use openings 11TS etc. Where a second lamp or other device is also to be controlled by 3-way switches 55, 56, the wires of another cable (not shown) are inserted into openings 23N, 23G, 23C on face 23 of box 10A and run to the same respective openings (Face 23) in the second lamp box (not shown).

A standard, commercially available, 3-way switch 55, 56 is mounted in each box 10B and 10C, respectively. Each standard 3-way switch is easily assembled into the utility compartment 19 of box 10 by merely attaching one end of a short length of wire to each of the traveler (T), traveler switch (TS) and common (C) terminals of switch 55, 56 and inserting the other ends of these wires into the appropriate busses underlying respective openings 17T, 17TS, and 17C in partition 17 (FIG. 5). The switches 55, 56 can then be secured into utility compartment 19 of box 10 by screws which cooperate with mounting openings 22 (FIG. 5).

To connect lamp 50 into the circuitry of box 10A, one end of a short wire is connected to each of the lamp terminals and the other ends of these wires are inserted through openings 17C and 17N of partition 17 (FIG. 5). The lamp is then secured to box 10A by screws (not shown) which are threaded into mounting openings 21. It will be noted that the distance between opposed but aligned mounting openings 22 is less than that between offset openings 21. This is due to the fact that the mounting holes in both standard switches and receptacles are closer together than the mounting holes of standard light fixtures (i.e. lamp 50). By providing the two different sets of mounting openings 21, 22, respectively, in the housing 10a of the present invention, a junction box of identical construction can be used equally for either purpose thereby making the present invention truly a universal prewired junction box.

To continue with the description of the circuitry of FIG. 1, electrical power is taken from box 10A and supplied to box 10D by a length of 3-wire cable 57 which has the individual wires at one end inserted into openings 25N, 25G, 25H (FIG. 7) of box 10A and the other ends thereof inserted into openings 24N, 24G and 24H, respectively, of box 10D. It is noted that power can always be taken from any "hot" box, i.e. a box that has power supplied thereto, by inserting the wires of a cable into the respective openings in either or both faces 25, 26 of the "hot" box, both of which provide separate power outlets for any particular box.

A lamp 58 has wires secured to its terminals which are inserted through openings 17SP, 17N of box 10D. It should be recognized here that if a particular lamp fixture, switch, or receptacle has a ground wire, it is always wired into box 10 through opening 17G.

Lamp 58 is controlled by a single pole switch (SP) 59 which is mounted in box 10E. Either end of each wire in 3-wire cable 60 is inserted through openings 112SP, 112G, and 112H (FIG. 6) of respective boxes 10D and 10E. The single pole switch 59 which is a standard, commercially-available switch, is wired into openings 17SP and 17H in partition 17 (FIG. 5). If a second lamp or other device is to be controlled by the same single pole circuit, wires of a 3-wire cable are run from openings 12SP, 12N, 12G of box 10D to similar openings in a second lamp box 10 (not shown).

Power is withdrawn from box 10D by cable 61 which has one end inserted in openings 25N, 25G, 25H of box 10D and its other end inserted in openings 24N, 24H, respectively, of box 10F. A standard, 2-plug receptacle 62 is wired into box 10E by short wires which are inserted in openings 17H, 17N in partition 17 (FIG. 50).

It will be noted that each set of aligned openings, e.g. those on top 11, bottom 12, and each of the faces 23, 24, 25, 26 are all positioned in a recess, e.g. 29 (FIG. 2) which is approximately ⅜ inch deep. This insures that the insulation on the electrical conductor, i.e. 3 or 4 wire cable, "breaks" the plane of the surface of box 10 when the individual wires are inserted into the appropriate openings. This satisfies the present safety requirements of electrical junction boxes as set by NEC (National Electrical Code).

The following will summarize the general concepts involved in the above described circuitry in FIG. 1 as they relate to the use of box 10 in any standard wiring operation. A singly constructed box 10 can be used as a junction box for a standard lamp fixture, a standard single pole switch, a standard 3-way switch, or a standard receptacle. Power can easily be taken from two different outlets (faces 25, 26) of any "hot" box and supplied to other remote lamp or receptacle boxes without ever disconnecting the utility device, i.e. lamp, from the hot box or without entering or rewiring the circuitry within the hot box. This is efficient and time saving in adding fixtures, receptacles, fans, etc. into existing wiring systems. By having readily prewired switch circuits present in each box 10, a lamp box (10A) can easily be wired so that the lamp can be controlled by two 3-way switches 55, 56 or an identical lamp box (10D) can be as easily wired so that the lamp can be controlled by a single pole switch 59. A prewired switch circuit is also available in each box so that a second, third, etc. lamp or the like can easily be controlled by the same 3-way or single pole switch, respectively, by connecting respective openings 23N, 23G, 23C of adjacent lamp boxes together where a 3-way circuit is involved or by connecting respective openings 12G, 12N, 12SP of adjacent lamp boxes together where a single pole circuit is involved. Box 10 is adapted to mount standard 3-way or single pole switches or receptacles via mounting holes 22 or standard lamp fixtures via mounting boxes 21 thereby eliminating the need to stock different configured boxes as is the case in the prior art.

As is known in the wiring art, sometimes there is a need for a "double box", that is, a terminal box that is to be used to mount two switches or two receptacles.

Such a box 70 is disclosed in FIGS. 16-19. The top 711 and bottom 712 of box 70 is broadened to increase the width of the utility compartment. The 3-way switch circuit openings 11TS, 11T, aaG, and 11C in top 811 single pole switch circuit openings 112SP, 112G, and openings 17C, 17T, 17TS, 17SP, 17N, 17G, and 17H in partition 17, and the respective buss elements within which box 817 are identical to the similarly numbered openings, etc., in the above described box 10. If box 70 is to be used for a 3-way switch, an electrical conductor, e.g. 4-wire cable (not shown), is connected between openings 11 in top 11 and a utility device, e.g. lamp, which is to be controlled by the 3-way circuit. A first 3-way switch is connected through openings 17C, 17TS, 17T in box 70 and is mounted by means of mounting holes 22.

If box 70 is to be used for a single pole switch circuit, an electrical conductor is connected between openings 112SP, 112G, and 112H and a utility device, e.g. lamp, which is to be controlled by the single pole circuit. A standard single pole switch is then connected to 17SP and 17H as before. A second set of separate busses (not shown) are positioned in planes A, B, C, D, and E of buss assembly 30 which establish a second separate circuit between (a) openings 711C in top 711 and opening 717C in partition 717; (b) between openings 711G and 717G; (c) between openings 711T and 717T; (d) between openings 711TS and 717TS; (e) between openings 712SP and 717SP; (f) between openings 712G and 717G; and (g) between openings 712H and 717H. The second set of openings in top 711 are adapted to be connected to a second utility device to be controlled by a separate 3-way switch circuit while the second set of openings in bottom 712 are adapted to be connected to a utility device which is to be controlled by a second separate single pole switch circuit.

As will be seen in FIG. 16, openings for neutral (N), ground (G), and hot (H) connectors are provided in faces 724, 725, 726 similarly as before with those in face 724 adapted to connect box 70 to a source of electrical power and those in faces 725 and 726 adapted to provide an output for electrical power, similarly as with box 10. Power is provided in box 70 when at least one receptacle is to be installed therein in which case the receptacle will be connected to openings 17H and 17N within the utility compartment. If two receptacles are to be used, they would be electrically connected together with one being wired to openings 17H and 17N as before. It can be seen that box 70 will accommodate two standard 3-way switches, two standard single pole switches, one 3-way switch and one single pole switch; two standard receptacles, or one receptacle and either a 3-way switch or a single pole switch.

Also, while universal box 10 of FIGS. 1-7 can be used equally as a lamp box, switch box or receptacle box, the construction can be modified only slightly to provide dedicated switch or receptacle boxes. FIGS. 8-11 disclose the external configuration of a dedicated receptacle box 80. The shape of the housing remains the same however, it is molded so that there are no openings in top 811, bottom 812, or face 823. The need for busses 38, 39 and 41 (see FIG. 3) are eliminated and the upper portion of buss 43 (i.e. slot 11H) can be removed, if desired. For ease of manufacturing, the other busses remain the same and provide the necessary outlets 817C, 817N, 817G, and 817H through partition 817 through which a standard receptacle can be wired. Power is input through the openings in 824 as before and can be taken from box 80 through the openings in either or both faces 825, 826.

FIGS. 12–15 disclose the external configuration of a dedicated switch box 90. The housing is molded with no openings in any of the faces 923, 924, 925, 926 and only one set of openings (911TS, 911T, 911G, 911C) for a 3-way switch in the top and one set of openings (912H, 912G, 912N) for a single pole switch in the bottom. Either a standard 3-way or a standard single pole switch can be wired into box 90 in the same manner as described above in relation to box 10.

What is claimed is:

1. A prewired junction box for making electrical wiring connections, said box comprising:
   a housing having a partition therein which divides the interior of said housing into a buss compartment and a utility compartment;
   first buss means in said buss compartment for establishing a prewired 3-way switch circuit through said housing from a first point adjacent the exterior surface of said housing to a second point adjacent said partition;
   means adapted to connect said first buss means to electrical conductor means which, in turn, is adapted to be connected to a first remote 3-way switch means; and
   means to connect said first buss means to electrical conductor means which, in turn, is adapted to be connected to a second remote 3-way switch means;
   opening means through said housing through which electrical conductor means of a 3-way circuit is adapted to be connected to said first buss means at said first point;
   opening means through said partition through which electrical conductor means of a 3-way utility device is adapted to be connected to said first buss means at said second point;
   second buss means in said buss compartment for establishing a prewired single pole switch circuit through said housing from a third point adjacent the exterior surface of said housing to a fourth point adjacent said partition;
   opening means through said housing through which electrical conductor means of a single pole circuit is adapted to be connected to said second buss means at said third point;
   opening means through said partition through which electrical conductor means of a single pole utility device is adapted to be connected to said second buss means at said fourth point;
   third buss means in said buss compartment for establishing a prewired hot electrical circuit through said housing from a fifth point adjacent the exterior surface of said housing to a sixth point adjacent said partition;
   opening means through said housing through which electrical conductor means of a hot electrical circuit is adapted to be connected to third buss means at said fifth point;
   opening means through said partition though which electrical conductor means of a utility device is adapted to be connected to said third buss means at said sixth point;
   opening means through said housing through which an electrical conductor means is adapted to be connected to said third buss means at a seventh point to provide an outlet for said hot electrical circuit from said box;
   a first set of mounting holes vertically aligned at the top and bottom of said utility compartment of said housing adapted to mount a standard switch or receptacle to said housing; and
   a second set of mounting holes offset at the top and the bottom of said utility compartment of said housing to increase the distance therebetween adapted to amount a standard light fixture to said housing.

2. A prewired junction box for making routine electrical wiring connections, said box comprising:
   a housing having a top, a bottom, a back and a polygonal front having four separate faces; said housing having a partition therein which divides the interior of said housing into a buss compartment and a utility compartment;
   a first buss element forming part of a 3-way switch circuit lying in a first parallel plane within said buss compartment and having one leg which lies adjacent said top of said housing and a perpendicular leg terminating adjacent said partition in said housing;
   an opening in said top to provide access to a first point on said first buss element;
   an opening in said partition to provide access to said perpendicular leg of said first buss element;
   a second buss element forming part of a single pole switch circuit lying in said first plane and having one leg lying adjacent said bottom and a perpendicular leg terminating adjacent said partition;
   an opening in said partition to provide access to said perpendicular leg of said second buss element;
   a third buss element forming part of said 3-way switch circuit lying in a second parallel plane within said buss compartment and having one leg which lies adjacent said top and a perpendicular leg terminating adjacent said partition;
   an opening in said top to provide access to a first point on said third buss element which aligns respectively to said first point on said first buss element;
   an opening in said partition to provide access to said perpendicular leg of said third buss element;
   a fourth buss element forming part of both said 3-way and said single pole switch circuits lying in a third parallel plane and having one leg lying adjacent said both the top and bottom of said housing and a perpendicular leg terminating adjacent said partition;
   an opening in said top to provide access to a first point of said fourth buss element which aligns respectively to said first points on both said first and third buss elements;
   an opening in said bottom to provide access to a first point on said fourth buss element which aligns respectively to said first point on said second buss element;
   an opening in said partition to provide access to said perpendicular leg of said fourth buss element;
   a fifth buss element forming part of said single pole switch circuit lying in a fourth parallel plane within said buss compartment and having one leg which lies adjacent said top and perpendicular leg terminating adjacent said partion;

an opening in said bottom to provide access to a first point on said fifth buss element which aligns respectively to said first point on said second and fourth buss elements;

an opening in said partition to provide access to said perpendicular leg of said fifth buss element;

a sixth buss forming part of said 3-way switch circuit lying in said fourth parallel plane within said buss compartment and having one leg which lies adjacent said top and a perpendicular leg terminating adjacent said partition;

an opening in said top to provide access to a first point on said sixth buss element which aligns respectively to said first point on said first, third, and fourth buss elements; and an opening in said partition to provide access to said perpendicular leg of said sixth buss element;

whereby said box provides a junction box for either a standard 3-way switch or a standard single pole switch by connecting the respective switch to its respective openings through said partition and by either connecting a 3-way circuit to said opening in said top or a single pole circuit to said openings in said bottom of said box.

3. The prewired junction box of claim 2 including:

a seventh buss element which acts as a neutral buss lying in said second parallel plane within said buss compartment and having one leg which lies adjacent both said bottom and all four faces of said housing and a perpendicular leg terminating adjacent said partition;

an opening in each of said four faces to provide access to a third, fourth, fifth, and sixth points, respectively, on said seventh buss element;

and wherein said one leg of said fourth buss element which acts as a ground buss also lies adjacent all four faces of said housing;

an opening in each of said four faces to provide access to a third, fourth, fifth, and sixth point on said fourth buss which align with said third, fourth, fifth, and sixth points on said seventh buss;

and wherein said one leg of said fifth buss element which acts as a hot buss lies adjacent three of said four faces and said top of said housing;

an opening in each of said three faces to provide access to a fourth, fifth, and sixth point on said fifth buss which align with said fourth, fifth, and sixth points, respectively, on said fourth and seventh busses; whereby electrical power can be supplied to said box by connecting the hot, neutral, and ground of a power conducting cable to said fourth, fifth, and seventh buss elements.

4. The junction box of claim 3 wherein said one leg of said sixth buss element which acts as a 3-way switch buss lies adjacent one of said four faces of said housing;

an opening in said one face to provide access to a third point on said sixth buss which aligns with said third point, respectively, on said fourth and seventh buss elements to thereby provide a circuit to control a second remote 3-way utility device through said box; and separate openings in said top of said housing to provide access to a second point, respectively, on said first, third, fourth and fifth buss elements which align with each other whereby said first points on said first, third, fourth, and sixth buss elements are adapted to be connected to a first remote 3-way switch and said second points on said third, fourth, and fifth buss elements are adapted to be connected to a second remote 3-way switch.

5. The prewired junction box of claim 4 including:

separate openings in said bottom to provide access to a second point, respectively, on said second, fourth, and seventh buss elements which align with each other whereby said second points are adapted to be connected to a second remote utility device which is to be controlled by the single pole switch circuit in said box.

6. The prewired junction box of claim 5 including:

a first set of mounting holes vertically aligned at the top and bottom of said utility compartment of said housing adapted to mount a standard switch or receptacle to said housing; and a second set of mounting holes offset at the top and the bottom of said utility compartment of said housing to thereby increase the distance therebetween adapted to mount a standard light fixture to said housing.

7. A prewired junction box for making electrical wiring connections, said box comprising:

a housing having a partition therein which divides the interior of said housing into a buss compartment and a utility compartment;

first buss means in said buss compartment for establishing a prewired 3-way switch circuit through said housing from a first point adjacent the exterior surface of said housing to a second point adjacent said partition;

means adapted to connect said first buss means to electrical conductor means which, in turn, is adapted to be connected to a first remote 3-way switch means; and means to connect said first buss means to electrical conductor means which, in turn, is adapted to be connected to a second remote 3-way switch means;

opening means through said housing through which electrical conductor means of a 3-way circuit is adapted to be connected to said first buss means at said first point;

opening means through said partition through which electrical conductor means of a 3-way utility device is adapted to be connected to said first buss means at said second point;

second buss means in said buss compartment for establishing a prewired single pole switch circuit through said housing from a third point adjacent the exterior surface of said housing to a fourth point adjacent said partition;

opening means through said housing through which electrical conductor means of a single pole circuit is adapted to be connected to said second buss means at said third point;

opening means through said partition through which electrical conductor means of a single pole utility device is adapted to be connected to said second buss means at said fourth point;

third buss means in said buss compartment for establishing a prewired hot electrical circuit through said housing from a fifth point adjacent the exterior surface of said housing to a sixth point adjacent said partition;

opening means through said housing through which electrical conductor means of a hot electrical circuit is adapted to be connected to third buss means at said fifth point;

opening means through said partition though which electrical conductor means of a utility device is adapted to be connected to said third buss means at said sixth point;

opening means through said housing through which an electrical conductor means is adapted to be connected to said third buss means at a seventh point to provide an outlet for said hot electrical circuit from said box; and wherein said exterior surface of said housing comprises:

a top, a bottom, a back, and a polygonal face having four separate faces; and wherein:

said first point on said first buss lies adjacent to said top;

said third point on said second buss lies adjacent said bottom;

said means for connecting said first buss to remote 3-way utility device lies adjacent the first of said four faces;

said fifth point on said third buss means lies adjacent the second of said four faces; and said seventh point on said third buss means lies adjacent both the third and fourth of said four faces.

* * * * *